(12) United States Patent
Krämer

(10) Patent No.: US 10,924,022 B2
(45) Date of Patent: Feb. 16, 2021

(54) QUASIRESONANT FLYBACK CONVERTER

(71) Applicant: HITACHI AUTOMOTIVE SYSTEMS, LTD., Ibaraki (JP)

(72) Inventor: Manfred Krämer, Otzberg (DE)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/609,814

(22) PCT Filed: Apr. 24, 2018

(86) PCT No.: PCT/JP2018/017362
§ 371 (c)(1),
(2) Date: Oct. 31, 2019

(87) PCT Pub. No.: WO2018/203544
PCT Pub. Date: Nov. 8, 2018

(65) Prior Publication Data
US 2020/0059161 A1    Feb. 20, 2020

(30) Foreign Application Priority Data

May 3, 2017   (EP) ..................... 17169230

(51) Int. Cl.
*H02M 3/335* (2006.01)
*H02M 1/08* (2006.01)
*H02M 1/00* (2006.01)

(52) U.S. Cl.
CPC ....... *H02M 3/33523* (2013.01); *H02M 1/083* (2013.01); *H02M 2001/0058* (2013.01)

(58) Field of Classification Search
CPC ..... H02M 3/33523; H02M 2001/0058; H02M 1/083; H02M 3/33507; H02M 1/40; Y02B 70/10
See application file for complete search history.

(56) References Cited

U.S. PATENT DOCUMENTS 5,497,311 A    3/1996  Hanawaka
7,035,122 B2 *  4/2006  Kim ................. H02M 3/33507
                                              363/21.16

(Continued)

FOREIGN PATENT DOCUMENTS

JP    2007-244121    9/2007
JP    2013-110776    6/2013

OTHER PUBLICATIONS

International Search Report dated Jul. 24, 2018 in International (PCT) Application No. PCT/JP2018/017362.

(Continued)

*Primary Examiner* — Emily P Pham
(74) *Attorney, Agent, or Firm* — Wenderoth, Lind & Ponack, L.L.P.

(57) ABSTRACT

A flyback converter having a transformer that includes a primary coil connected to the input terminal and a secondary coil, a semiconductor switch configured to switch current flow through the primary coil, a first measurement unit configured to measure the DC input voltage, and a second measurement unit configured to measure a voltage across the semiconductor switch. The flyback converter also includes a control unit having a synchronization terminal and configured to output a switching signal to the semiconductor switch with a constant frequency in accordance with a synchronization signal input to the synchronization terminal. In addition, the flyback converter includes a frequency adjustment unit configured to transmit a synchronization signal to the synchronization terminal based on the DC input voltage and the voltage measured by the second measurement unit such that the frequency of the switching signal output from the control unit becomes variable.

11 Claims, 3 Drawing Sheets

(56) References Cited

U.S. PATENT DOCUMENTS

| | | | | |
|---|---|---|---|---|
| 8,867,237 | B2* | 10/2014 | Desimone | H02M 1/44 |
| | | | | 363/21.05 |
| 2008/0239766 | A1* | 10/2008 | Trattler | H02M 3/33523 |
| | | | | 363/21.05 |
| 2008/0278974 | A1 | 11/2008 | Wu | |
| 2009/0224742 | A1 | 9/2009 | Ertl et al. | |
| 2009/0296437 | A1 | 12/2009 | Li et al. | |
| 2010/0308733 | A1* | 12/2010 | Shao | H02M 1/4258 |
| | | | | 315/119 |
| 2010/0315838 | A1* | 12/2010 | Mao | H02M 3/33507 |
| | | | | 363/16 |
| 2011/0182089 | A1* | 7/2011 | genannt Berghegger | |
| | | | | H02M 3/33507 |
| | | | | 363/21.13 |
| 2011/0199794 | A1* | 8/2011 | Tumminaro | H02M 3/33507 |
| | | | | 363/21.13 |
| 2012/0299561 | A1 | 11/2012 | Chen et al. | |
| 2016/0336861 | A1* | 11/2016 | Gritti | H02M 3/33507 |

OTHER PUBLICATIONS

Written Opinion of the International Searching Authority dated Jul. 24, 2018 in International (PCT) Application No. PCT/JP2018/017362.

Extended European Search Report dated Nov. 15, 2017 in corresponding European Patent Application No. 17169230.4.

\* cited by examiner

QUASIRESONANT FLYBACK CONVERTER

TECHNICAL FIELD

The present invention relates to quasiresonant flyback converters. More specifically, the present invention relates to quasiresonant flyback converters used in battery supplied automotive high voltage (HV) amplifiers to produce modulated HV voltages.

BACKGROUND ART

The general layout of a flyback converter is shown in FIG. 1. The flyback converter transforms a DC input voltage from a power source 100 to another DC voltage for a load 1. For this purpose, the flyback converter comprises a transformer 10 with a core and a semiconductor switch 3. The switching operation of the switch 3 is controlled by a controller 110.

When the switch 3 is closed, current flows through the primary winding of the transformer 10. Energy is stored in the magnetic field of the transformer 10. A diode 120 prevents current from flowing through the secondary winding of the transformer 10 into the load 1. More specifically, the diode 120 is a reversed biased diode connected in series to the secondary winding. At this stage, a capacitor 130 supplies the load 1 with electric energy.

Afterwards, the controller 110 opens the switch 3 such that the current through the primary winding of the transformer 10 goes to zero. At the same time the secondary diode starts conducting and the secondary current raises up to its peak value. The transformer rolls out the energy to the capacitor 130 and the load 1.

The controller 110 supplies a PWM-signal to the switch 3 whose duty ratio controls the amount of energy transferred to the load 1.

There are different ways to control the switching operation of the switch 3.

In a conventional fixed/constant frequency flyback converter, the switch 3 is turned on at a fixed frequency and turned off when the current on the primary side reaches a desired level.

Once the energy stored in the core of the transformer 10 is discharged to the load 1 (the core is demagnetized), the main inductance together with winding capacitance and the output capacitance of the switch 3 form a resonant circuit inducing a damped oscillation of the drain-source voltage across the switch 3 (so-called parallel resonance oscillation). Therefore, the switch 3 may be closed during a high voltage period leading to high switching losses. Furthermore, the parallel resonance waves oscillate during the whole freewheeling time period of a clock cycle, leading to additional power dissipation in the core.

Furthermore, there is an additional oscillation in flyback converters which are subject to high parasitic losses (e.g. leakage inductance and winding capacitance). In this case, the leakage inductance of the transformer oscillates with the winding capacitance and the to this paralleled connected load diode capacitance, causing a series resonant circuit during turn-on. Since the leakage inductance is much smaller than the inductance of the primary winding, the frequency of the series resonance oscillation is higher than the frequency of the parallel resonance oscillation. The series resonance currents during turn on time of the switch are superimposed on the primary current, making current sensing more difficult. This means that current mode control often fails. In addition, these currents magnetize the core, leading to a higher core temperature.

Thus, series and parallel resonance oscillations reduce the efficiency of a constant frequency flyback converter.

A variable frequency flyback converter (also called quasi-resonant flyback converter) dramatically minimized the influence of the resonance oscillations. In quasi-resonance, the switch 3 is turned on, cycle by cycle, by the controller 110 when the drain-source voltage reaches a minimum value (negative valley point). This valley arises after demagnetization of the core, even if all the transformer energy has been transferred to the load 1. Conventionally, an auxiliary winding is used to detect the valley point. The quasi-resonant flyback converter works in discontinuous mode with variable frequency, which value is essentially depending on the load resistance and the input voltage.

In view of the above, it is an object of the present invention to overcome the problems of constant frequency flyback converters and realize a quasi-resonant flyback converter with a simple layout.

SUMMARY OF INVENTION

This object is accomplished by the flyback converter according to claim 1.

The flyback converter comprises an input terminal configured to receive a DC input voltage, a transformer comprising a primary coil connected to the input terminal and a secondary coil, a semiconductor switch configured to switch current flow through the primary coil, a first measurement unit configured to measure the DC input voltage, and a second measurement unit configured to measure a voltage across the semiconductor switch. The flyback converter also comprises a control unit having a synchronization terminal and configured to output a switching signal to the semiconductor switch with a constant frequency in accordance with a synchronization signal input to the synchronization terminal. In addition, the flyback converter comprises a frequency adjustment unit configured to transmit a synchronization signal to the synchronization terminal based on the DC input voltage measured by the first measurement unit and the voltage measured by the second measurement unit such that the frequency of the switching signal output from the control unit becomes variable.

Hence, the present invention uses a constant frequency flyback controller as a quasi-resonant flyback controller. To do so, the present invention manipulates the synchronization input of the constant frequency flyback controller. This eliminates the need for an auxiliary winding whereby the layout of the flyback converter is simplified. Furthermore, this design minimizes the influence of the parasitics, increases the efficiency of the flyback converter and reduces EMC emissions.

According to one aspect, the frequency adjustment unit comprises a delay unit configured to delay the DC input voltage measured by the first measurement unit and the voltage measured by the second measurement unit by a predetermined time delay.

According to another aspect, the predetermined time delay is equal to a quarter of the period duration of the parallel resonance oscillation of the transformer. With this delay time, the valley point can be reliably detected.

According to another aspect, the delay unit is a low-pass filter. With a low-pass filter, a simple design of the flyback converter is possible.

According to another aspect, the frequency adjustment unit comprises a comparator configured to compare the delayed DC input voltage with the delayed Vds voltage measured by the second measurement unit, and transmit the synchronization signal to the control unit when the delayed DC input voltage equals the delayed Vds voltage measured by the second measurement unit.

According to another aspect, the frequency adjustment unit comprises a differential circuit configured to calculate a difference between the DC input voltage measured by the first measurement unit and the Vds voltage measured by the second measurement unit, the delay unit is configured to delay the difference calculated by the differential circuit, and the comparator is configured to transmit the synchronization signal to the control unit when the delayed difference crosses zero.

According to another aspect, the comparator configured to reset the synchronization signal when the DC input voltage measured by the first measurement unit equals the delayed voltage signal again.

According to another aspect, the frequency adjustment unit comprises an attenuation unit configured to attenuate the DC input voltage measured by the first measurement unit and the Vds voltage measured by the second measurement unit.

According to another aspect, the switching signal is a PWM signal, and the control unit is configured to Turn-On the semiconductor switch in synchronization with the synchronization signal.

According to another aspect, the synchronization signal is a square wave signal.

According to another aspect, the frequency adjustment unit configured to transmit the synchronization signal to the synchronization terminal at each cycle of the flyback converter operation.

According to another aspect, the control unit comprises an oscillator configured to output the constant frequency, and the constant frequency is set lower than a desired minimum value of the variable frequency output from the control unit.

DESCRIPTION OF EMBODIMENTS

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

Figure 1:
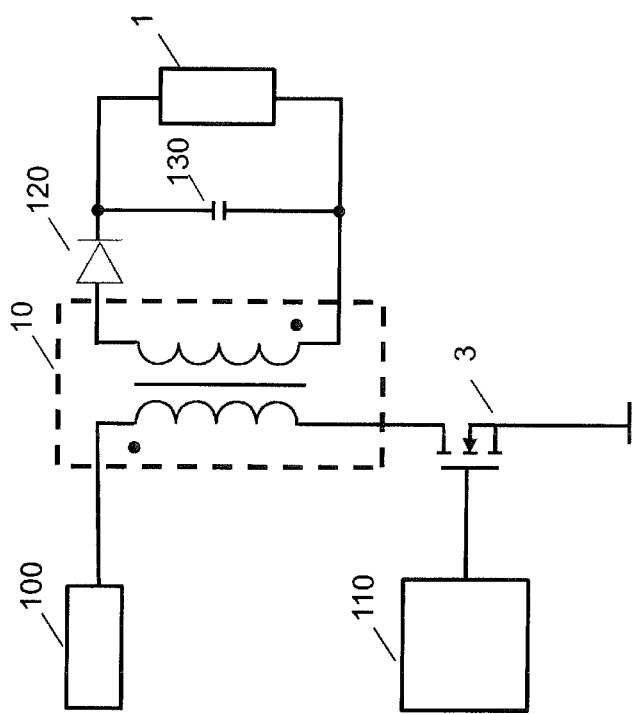
FIG. 1 shows the general layout of a flyback converter.
Figure 2:
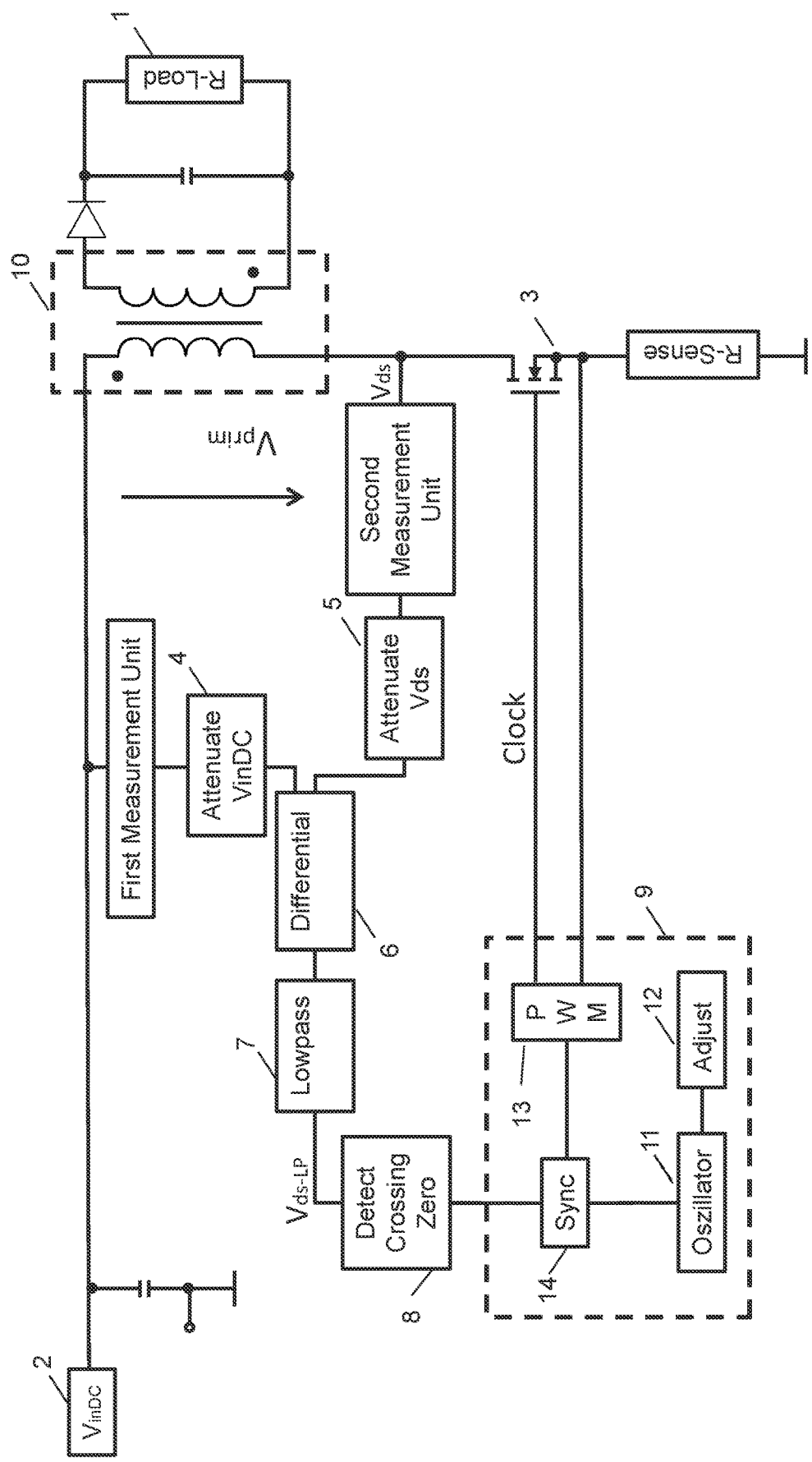
FIG. 2 shows a flyback converter according to an embodiment of the present invention.

FIG. 2 shows a flyback converter according to an embodiment of the present invention.

The flyback converter comprises an input terminal configured to receive a DC input voltage $V_{inDC}$. The DC input voltage $V_{inDC}$ is supplied from a power source 2. The power source may be a vehicle battery.

The flyback converter further comprises a transformer 10 comprising a primary coil connected to the input terminal and a secondary coil.

The secondary coil is connected to a load 1 that is to be supplied with a DC voltage different from the DC input voltage $V_{inDC}$. The secondary side circuit also includes a capacitor and a diode.

The flyback converter further comprises a semiconductor switch 3 configured to switch current flow through the primary coil. The semiconductor switch 3 may be a MOSFET (metal-oxide-semiconductor field-effect transistor), especially a VMOS. When the semiconductor switch 3 is closed, current can flow through the primary winding. When the semiconductor switch 3 is open, current flow through the primary winding is prevented.

The flyback converter further comprises a first measurement unit configured to measure the DC input voltage $V_{inDc}$ and a second measurement unit configured to measure a voltage $V_{ds}$ across the semiconductor switch. The voltage $V_{ds}$ of the semiconductor switch 3 is essentially the sum of the input battery voltage and the reflected output voltage at the primary winding.

The flyback converter further comprises a control unit 9 having a synchronization terminal and configured to output a switching signal to the semiconductor switch 3 with a constant frequency in accordance with a synchronization signal input to the synchronization terminal. The output of the control unit 9 is connected to the gate terminal of the semiconductor switch 3. Hence, the control unit 9 acts as a gate driver for the semiconductor switch 3.

The main functionality of the control unit 9 is to switch the semiconductor switch with a constant frequency. In other words, the control unit 9 is a conventional control unit for a constant frequency flyback converter (constant frequency controller). This conventional constant frequency controller has a synchronization terminal in order to synchronize the constant frequency switching signal with an input synchronization signal. That is, when a synchronization signal is connected to the input, e new clock cycle will be started. More specifically, the control unit 9 starts outputting the switching signal when a rising edge of the synchronization signal is detected. A falling edge of the synchronization signal is ignored by the control unit 9.

The synchronization signal preferably is a square wave signal. In this case, a new switching cycle will be started, when the rising edge of the square wave signal is received at the synchronization terminal. In other words, the rising edge of the switching signal is synchronized with the rising edge of the square wave signal.

The switching signal can be a PWM signal. In this case, the control unit 9 comprises a PWM unit 13 configured to generate and output the PWM signal. The raising edge of the PWM signal is output in synchronization with the synchronization signal. That is, the rising edge of the PWM signal corresponds to the rising edge of the synchronization signal.

The control unit 9 may comprises an oscillator 11 configured to generate the constant frequency $f_{clock}$ and an adjusting unit 12 configured to adjust the value of the constant frequency. The constant frequency $f_{clock}$ is preferably set lower than a desired minimum value of the variable frequency output from the control unit. In other words, the constant frequency $f_{clock}$ of the oscillator 11 is adjusted by the adjusting unit 12 to a lower value than that desired minimum switching frequency of the quasi-resonant flyback converter. A typical value for $f_{clock}$ is 30 kHz. The constant frequency $f_{clock}$ is usually set during manufacturing of the flyback controller and remains unchanged after shipment. The switching frequency of the quasi-resonant flyback converter is typically in the order of 50-300 kHz.

According to the present invention, the constant frequency control unit 9 is used to drive the flyback converter in quasi-resonance. Specifically, the synchronization input of the control unit 9 is used to make the constant frequency generated by the control unit 9 variable. A valley signal (synchronization signal) is derived from the Vds voltage of the primary switch, for triggering, cycle by cycle, the synchronization input of the controller 9. Each trigger pulse at the synchronization input starts a new PWM cycle by setting $f_{clock}$ with each synchronization signal at the synchronization input.

To this end, the flyback converter further comprises a frequency adjustment unit configured to transmit a synchronization signal to the synchronization terminal based on the DC input voltage $V_{inDC}$ measured by the first measurement unit and the voltage $V_{ds}$ measured by the second measurement unit such that the frequency of the switching signal output from the control unit 9 becomes variable. In other words, the synchronization signal serves as a trigger signal to trigger a new clock cycle in the first valley of the parallel resonance oscillation of the transformer, which happens in the free wheeling period of the transformer.

The frequency of the flyback converter is no longer defined by the control unit 9. The synchronization signal connected to the synchronization input of the control unit 9 defines the switching frequency.

The frequency adjustment unit may comprise a delay unit 7 configured to delay the difference between the DC input voltage $V_{inDC}$ measured by the first measurement unit and the voltage $V_{ds}$ measured by the second measurement unit by a predetermined time delay. The delay unit 7 is preferably a single pole low-pass filter.

The predetermined time delay is preferably equal to a quarter of the period duration of the parallel resonance oscillation of the transformer 10. With this time delay, the valley point of drain-source voltage $V_{ds}$ during the parallel resonance oscillation can be reliably detected.

An aspect of the present invention relies in comparing the delayed drain-source voltage $V_{ds}$ with the delayed DC input voltage $V_{inDC}$. To this end, the frequency adjustment unit comprises a comparator 8 configured to compare the delayed DC input voltage measured $V_{inDc}$ with the delayed voltage signal $V_{ds}$. When the delayed drain-source voltage $V_{ds}$ equals the DC input voltage $V_{inDC}$, the comparator 8 transmit the synchronization signal to the control unit 9.

In the embodiment shown in FIG. 2, the above comparison is performed using a differential circuit 6 configured to calculate a difference between the DC input voltage $V_{inDC}$ and the drain-source voltage $V_{ds}$. In this case, the delay unit 7 is configured to delay the difference calculated by the differential circuit 6 and the comparator 8 is configured to transmit the synchronization signal to the control unit 9 when the delayed slowing down difference crosses zero. In this way, equality of the DC input voltage $V_{inDC}$ and the drain-source voltage Vds is detected.

However, it should be noted that determining equality of the DC input voltage $V_{inDC}$ and the drain-source voltage $V_{ds}$ is not limited to the specific case shown in FIG. 2. The differential calculation is optional.

The comparator 8 is configured with a hysteresis to reset the synchronization trigger signal when the delayed now rising up Vds signal equals the delayed DC input voltage again. The comparator 8 is preferably a high-speed comparator.

The frequency adjustment unit may comprise an attenuation unit 4, 5 configured to attenuate the DC input voltage $V_{inDC}$ and the drain-source voltage $V_{ds}$. The attenuation unit preferably provides separate attenuation circuits for the DC input voltage $V_{inDC}$ and the drain-source voltage $V_{ds}$. The attenuation circuits are preferably voltage dividers.

Furthermore, the frequency adjustment unit may be configured to transmit the synchronization signal to the synchronization terminal at each cycle of the flyback converter operation.

Figure 3:
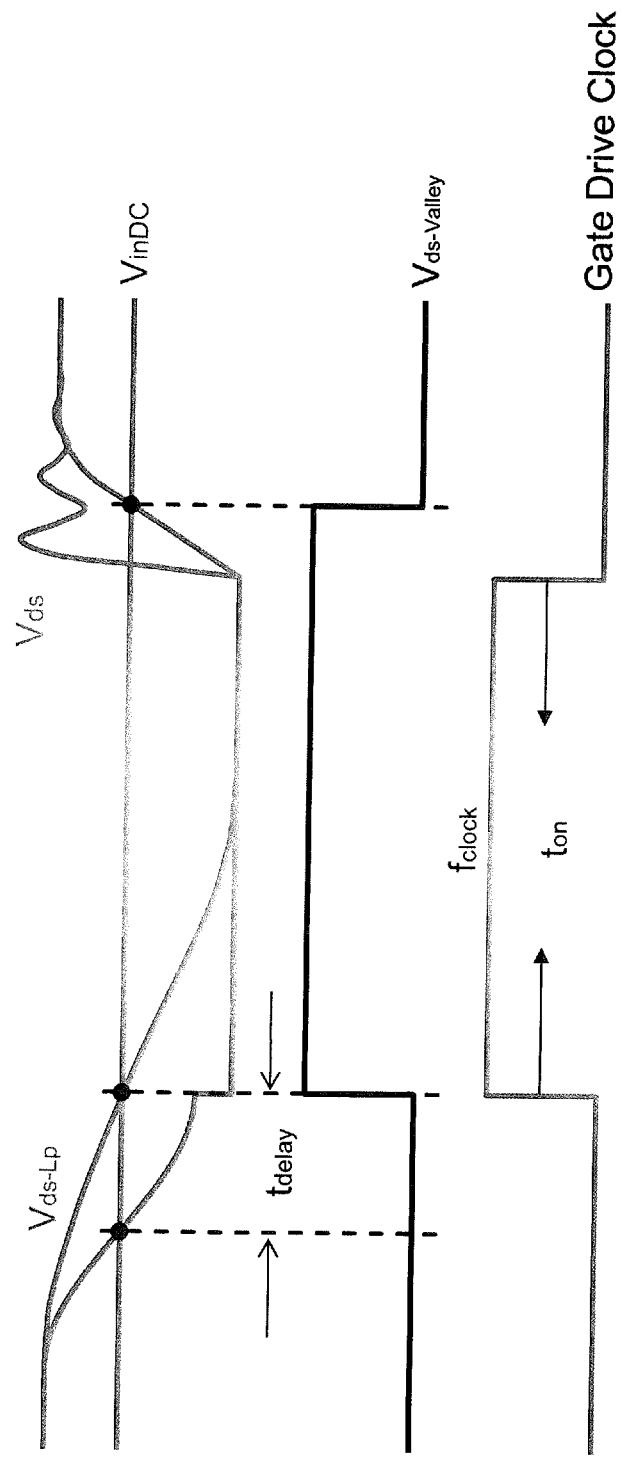
FIG. 3 shows the temporal behavior of the different voltage signals according to an embodiment of the present invention.

FIG. 3 shows the temporal behavior of the different voltage signals according to an embodiment of the present invention.

FIG. 3 shows the drain-source voltage $V_{ds}$ of the semiconductor switch 3, the delayed drain-source voltage $V_{ds-Lp}$ produced by the low-pass filter 7, the input voltage $V_{inDC}$, the synchronization signal $V_{ds-valley}$ and the clock signal output from the control unit 9.

The attenuated drain-source voltage Vds is delayed by a time $t_{delay}$. The time $t_{delay}$ is set such that the delayed drain-source voltage $V_{ds-Lp}$ equals the input voltage $V_{inDC}$ when the drain-source voltage $V_{ds}$ reaches the first valley point of the parallel resonance oscillation. Thus $t_{delay}$ may be set to a quarter of the period duration of the well known parallel resonance oscillation of the transformer 10.

At this point in time, the synchronization signal $V_{ds\text{-}valley}$ is output to the control unit 9. The rising edge of the synchronization signal $V_{ds-valley}$ triggers the control unit 9 to start a new clock cycle by driving the gate of the primary switch.

When the gate drive clock signal is switched off, the drain-source voltage $V_{ds}$ rises up and the switch off serious resonance oscillation (it differs from the switch on series resonance, because of short circuit of the loading diode capacitance) starts.

FIG. 3 exemplarily shows that the synchronization signal is reset when the delayed rising-up drain-source voltage $V_{ds-Lp}$ equals the input voltage $V_{inDC}$ again. That is, the delayed drain-source voltage $V_{ds-Lp}$ becomes greater than the input voltage $V_{inDC}$. The exact time point of resetting the synchronization trigger signal is however not critical. The synchronization signal should be reset before the next cycle of the flyback operation starts.

In quasi-resonance, at the switch-on starting point of $t_{on}$, the ramping up current is still zero, and the reflected transformer voltage $V_{prim}$ and thus the drain-source voltage $V_{ds}$ is at its minimum. Therefore, the switch-on losses are reduced, providing a better overall efficiency and better EMC behavior.

Further advantages of the quasi-resonant flyback converter are reduced transformer resonance currents and resonance voltages, which further improve EMC, and the reduced core losses, enhancing the efficiency.

The invention claimed is:

1. A flyback converter, comprising:
   an input terminal configured to receive a DC input voltage;
   a transformer comprising a primary coil connected to the input terminal and a secondary coil;
   a semiconductor switch configured to switch current flow through the primary coil;
   a first measurement unit configured to measure the DC input voltage;
   a second measurement unit configured to measure a voltage across the semiconductor switch;
   a control unit having a synchronization terminal and configured to output a switching signal to the semiconductor switch with a constant frequency in accordance with a synchronization signal input to the synchronization terminal; and a frequency adjustment unit configured to transmit a synchronization signal to the synchronization terminal based on the DC input voltage measured by the first measurement unit and the voltage measured by the second measurement unit such that the constant frequency of the switching signal output from the control unit becomes variable, wherein the frequency adjustment unit comprises a delay unit configured to delay the DC input voltage measured by the first measurement unit and the voltage measured by the second measurement unit by a predetermined time delay.

2. The flyback converter according to claim 1, wherein the predetermined time delay is equal to a quarter of the period duration of the parallel resonance oscillation of the transformer.

3. The flyback converter according to claim 1, wherein the delay unit is a low-pass filter.

4. The flyback converter according to claim 1, wherein the frequency adjustment unit comprises a comparator configured to
compare a delayed DC input voltage with a delayed voltage measured by the second measurement unit, and
transmit the synchronization signal to the control unit when the delayed DC input voltage equals the delayed voltage measured by the second measurement unit.

5. The flyback converter according to claim 4, wherein
the frequency adjustment unit comprises a differential circuit configured to calculate a difference between the DC input voltage measured by the first measurement unit and the voltage measured by the second measurement unit,
the delay unit is configured to delay the difference calculated by the differential circuit, and
the comparator is configured to transmit the synchronization signal to the control unit when a delayed difference crosses zero.

6. The flyback converter according to claim 4, wherein the comparator configured to reset the synchronization signal when the DC input voltage measured by the first measurement unit equals the delayed voltage signal again.

7. The flyback converter according to claim 1, wherein the frequency adjustment unit comprises an attenuation unit configured to attenuate the DC input voltage measured by the first measurement unit and the voltage measured by the second measurement unit.

8. The flyback converter according to claim 1, wherein
the switching signal is a PWM signal, and
the control unit is configured to switch the semiconductor switch in synchronization with the synchronization signal.

9. The flyback converter according to claim 1, wherein the synchronization signal is a square wave signal.

10. The flyback converter according to claim 1, wherein the frequency adjustment unit configured to transmit the synchronization signal to the synchronization terminal at each cycle of the flyback converter.

11. The flyback converter according to claim 1, wherein
the control unit comprises an oscillator configured to output the constant frequency, and
the constant frequency is set lower than a desired minimum value of the variable frequency output from the control unit.

* * * * *